United States Patent
Ji

(10) Patent No.: US 10,079,981 B2
(45) Date of Patent: Sep. 18, 2018

(54) IMAGE DYNAMIC RANGE ADJUSTMENT METHOD, TERMINAL, AND STORAGE MEDIUM

(71) Applicant: ZTE Corporation, Shenzhen, Guangdong (CN)

(72) Inventor: Dewei Ji, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/517,662

(22) PCT Filed: Mar. 5, 2015

(86) PCT No.: PCT/CN2015/073727
§ 371 (c)(1),
(2) Date: Apr. 7, 2017

(87) PCT Pub. No.: WO2016/054889
PCT Pub. Date: Apr. 14, 2016

(65) Prior Publication Data
US 2017/0310872 A1 Oct. 26, 2017

(30) Foreign Application Priority Data
Oct. 9, 2014 (CN) .......................... 2014 1 0529796

(51) Int. Cl.
*H04N 5/228* (2006.01)
*H04N 5/235* (2006.01)

(52) U.S. Cl.
CPC ................................ *H04N 5/2355* (2013.01)

(58) Field of Classification Search
CPC .. H04N 5/23232; H04N 5/2355; H04N 5/355; H04N 5/235; H04N 9/735; G06T 5/009; G06T 2207/20208
See application file for complete search history.

(56) References Cited

U.S. PATENT DOCUMENTS

| 6,023,533 | A | 2/2000 | Sano |
| 6,542,185 | B1 * | 4/2003 | Bogardus ............... H04N 9/735 348/188 |

(Continued)

FOREIGN PATENT DOCUMENTS

| CN | 101420531 A | 4/2009 |
| CN | 201393267 Y | 1/2010 |

(Continued)

OTHER PUBLICATIONS

International Search Report in international application No. PCT/CN2015/073727, dated Jul. 22, 2015, 2 pgs.

(Continued)

*Primary Examiner* — Kelly L Jerabek
(74) *Attorney, Agent, or Firm* — Cooper Legal Group, LLC

(57) ABSTRACT

Disclosed in an embodiment of the present invention is an image dynamic range adjustment method, the method comprising: decoding a to-be-adjusted image selected by a user into YUV data; performing regional partition on the to-be-adjusted image according to a predetermined division policy and the YUV data, and obtaining a Y component reference value corresponding to at least one region; adjusting the YUV data corresponding to each region of the at least one region according to an adjusting coefficient, to obtain the adjusted YUV data of each of the regions, the adjusting coefficient being obtained on the basis of the Y component reference value; obtaining the image after the dynamic range adjustment on the basis of the adjusted YUV data. Also disclosed in the embodiment of the present invention are a terminal and a storage media.

15 Claims, 4 Drawing Sheets

(56) References Cited

U.S. PATENT DOCUMENTS

| | | |
|---|---|---|
| 7,251,057 B2 | 7/2007 | Tsujino |
| 2002/0196483 A1 | 12/2002 | Tsujino |
| 2005/0094892 A1 | 5/2005 | Choe |
| 2007/0269104 A1* | 11/2007 | Whitehead .............. G06T 5/008 |
| | | 382/162 |
| 2009/0244366 A1 | 10/2009 | Kamimura |
| 2011/0001841 A1* | 1/2011 | Shiraishi .............. H04N 5/2355 |
| | | 348/223.1 |
| 2015/0254822 A1* | 9/2015 | Levy ....................... G06T 5/009 |
| | | 382/264 |
| 2016/0037044 A1* | 2/2016 | Motta .................... H04N 9/045 |
| | | 348/221.1 |
| 2017/0078706 A1* | 3/2017 | Van Der Vleuten ..... H04N 5/20 |

FOREIGN PATENT DOCUMENTS

| | | |
|---|---|---|
| CN | 102231264 A | 11/2011 |
| EP | 0866423 A2 | 9/1998 |
| EP | 1530155 A2 | 5/2005 |

OTHER PUBLICATIONS

English Translation of the Written Opinion of the International Search Authority in international application No. PCT/CN2015/073727, dated Jul. 22, 2015, 5 pgs.

Supplementary European Search Report in European application No. 15849460.9, dated Sep. 18, 2017, 7 pgs.

\* cited by examiner

Fig. 2

| | | | | | | | | |
|---|---|---|---|---|---|---|---|---|
| | Y1 | Y2 | Y3 | Y4 | ... ... | Y[L-3] | Y[L-2] | Y[L-1] | Y[L] |
| | Y[L+1] | Y[L+2] | Y[L+3] | Y[L+4] | ... ... | Y[2L-3] | Y[2L-2] | Y[2L-1] | Y[2L] |
| | ... ... | | | | ... ... | | | | ... ... |
| | Y[L(W-2)+1] | Y[L(W-2)+2] | Y[L(W-2)+3] | Y[L(W-2)+4] | | Y[L(W-1)-3] | Y[L(W-1)-2] | Y[L(W-1)-1] | Y[L(W-1)] |
| | Y[L(W-1)+1] | Y[L(W-1)+2] | Y[L(W-1)+3] | Y[L(W-1)+4] | ... ... | Y[L(W-1)-3] | Y[L(W-1)-2] | Y[L(W-1)-1] | Y[LW] |
| | U1 | V1 | U2 | V2 | ... ... | U[L/2-1] | V[L/2-1] | U[L/2] | V[L/2] |
| | ... ... | | | | ... ... | | | | ... ... |
| | U[L(W-1)/2+1] | V[L(W-1)/2+1] | U[L(W-1)/2+2] | V[L(W-1)/2+2] | ... ... | U[LW/2-1] | V[LW/2-1] | U[LW/2] | V[LW/2] |

X (horizontal axis), Y (vertical axis)

Fig. 3

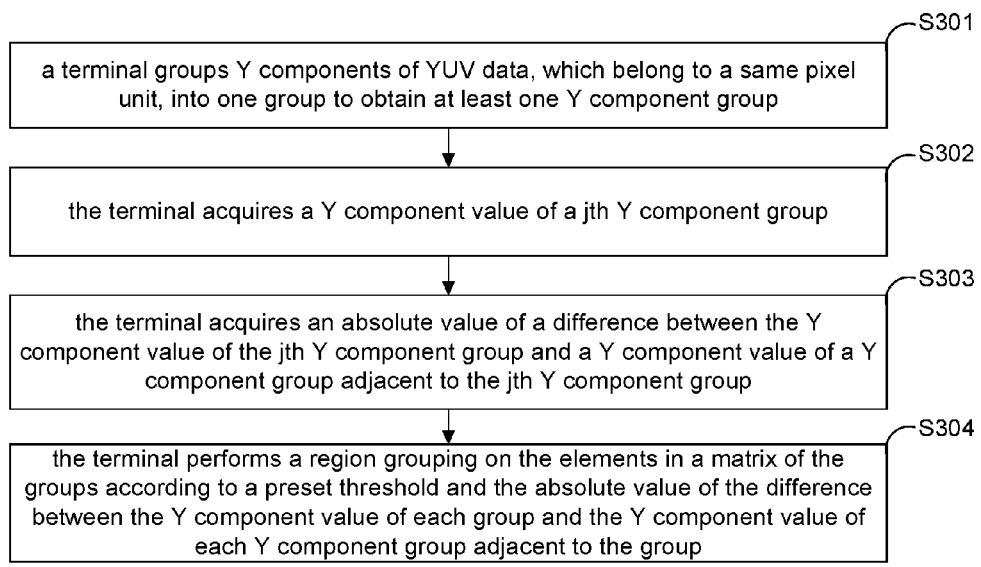

S301 — a terminal groups Y components of YUV data, which belong to a same pixel unit, into one group to obtain at least one Y component group S302 — the terminal acquires a Y component value of a jth Y component group S303 — the terminal acquires an absolute value of a difference between the Y component value of the jth Y component group and a Y component value of a Y component group adjacent to the jth Y component group S304 — the terminal performs a region grouping on the elements in a matrix of the groups according to a preset threshold and the absolute value of the difference between the Y component value of each group and the Y component value of each Y component group adjacent to the group

IMAGE DYNAMIC RANGE ADJUSTMENT METHOD, TERMINAL, AND STORAGE MEDIUM

TECHNICAL FIELD

The disclosure relates to the field of image processing technologies, and in particular to a method and a terminal for adjusting a dynamic range of an image and a storage medium.

BACKGROUND

As image technology develops rapidly, mobile smart terminals have gradually replaced cameras and become an important tool used in our daily life for taking pictures and making a video. Meanwhile, as users of mobile terminals become more and more professional, their requirements on the quality of the images taken with mobile terminals are getting higher and higher, wherein the dynamic range of an image has become an important factor valued by a user when judging the quality of the image.

The dynamic range of an image refers to a range starting from the 'darkest' part of the image and ending with the 'brightest' part of the image. The larger the dynamic range of an image is, the more gradations the image presents, and the more dark details and bright details the image records. The dynamic range is determined by a photosensitive element, and the dynamic range of a photosensitive element is set unchangeably after the photosensitive element is delivered. In the field of mobile smart terminals, due to the various limitations to the volume and the structure of smart terminals, smart terminals get smaller and smaller in size and higher and higher in pixel value, as a result, the effective light-sensing area of a single pixel becomes smaller and smaller, which affects the dynamic range of a camera. Therefore, it occurs often that in an image obtained by taking a scene where light changes remarkably in brightness, the dark part is too dark or a bright part is too bright, leading to the loss of details in the image and a reduction in the quality of the image.

SUMMARY

To address the technical problems existing in the conventional art, embodiments of the disclosure are intended to provide a method and a terminal for adjusting a dynamic range of an image, and a storage medium.

To achieve the purposes above, the solutions of the embodiments of the disclosure are as follows:

In a first aspect, a method for adjusting a dynamic range of an image is provided in an embodiment of the disclosure, including: decoding a user-selected image to be adjusted into YUV data; performing a region grouping on the image to be adjusted according to a preset grouping strategy and the YUV data to obtain a Y component reference value of at least one region; adjusting the YUV data of each of the at least one region according to an adjustment coefficient to obtain the adjusted YUV data of each region, wherein the adjustment coefficient is obtained based on the Y component reference value; and acquiring, based on the adjusted YUV data, an image subjected to dynamic range adjustment.

In an embodiment, performing a region grouping on the image to be adjusted according to a preset grouping strategy and the YUV data includes: grouping Y components of the YUV data, which belong to a same pixel unit, into one group to obtain at least one Y component group; acquiring the Y component value of the jth Y component group, where j represents a group number which is a positive integer; acquiring the absolute value of the difference between the Y component value of the jth Y component group and a Y component value of a Y component group adjacent to the jth Y component group; and performing a region grouping on elements in a matrix of the groups according to a preset threshold and the absolute value of the difference between the Y component value of each group and the Y component value of each Y component group adjacent to the group.

In an embodiment, when the jth Y component group is in the first row of all the Y component groups and j is not equal to 1, a Y component group adjacent to the jth Y component group refers to the (j−1)th Y component group which is located on the left of and adjacent to the jth Y component group; or when the jth Y component group is in the first column of all the Y component groups and j is not equal to 1, a Y component group adjacent to the jth Y component group refers to the (j−L)th Y component group which is located above and adjacent to the jth Y component group; or when the jth Y component group is not in the first row and the first column, a Y component group adjacent to the jth Y component group refers to the (j−1)th Y component group and the (j−L)th Y component group.

In an embodiment, acquiring the absolute value of the difference between the Y component value of the jth Y component group and the Y component value of the Y component group adjacent to the jth Y component group includes: calculating a first absolute value of the difference between the Y component value of the jth Y component group and an average value of the Y components in the (j−1) Y component group when a Y component group adjacent to the jth Y component group refers to the (j−1)th Y component group; or calculating a second absolute value of the difference between the Y component value of the jth Y component group and an average value of the Y components in the (j−L) Y component group when a Y component group adjacent to the jth Y component group refers to the (j−L)th Y component group; or separately calculating the first and the second absolute values when a Y component group adjacent to the jth Y component group refers to the (j−1)th Y component group and the (j−L)th Y component group.

In an embodiment, performing a region grouping on the elements in the matrix of the groups according to a preset threshold and the absolute value of the difference between the Y component value of each group and a Y component value of each Y component group adjacent to the group includes: comparing the first absolute value with the preset threshold and performing a region grouping on the jth Y component group and the (j−1)th Y component group when a Y component group adjacent to the jth Y component group refers to the (j−1)th Y component group; or comparing the second absolute value with the preset threshold and performing a region grouping on the jth Y component group and the (j−L)th Y component group when a Y component group adjacent to the jth Y component group refers to the (j−L)th Y component group; or comparing the first absolute value and the second absolute value separately with the preset threshold and separately performing a region grouping on the jth Y component group and the (j−1)th Y component group and on the jth Y component group and the (j−L)th Y component group when a Y component group adjacent to the jth Y component group refers to the (j−1)th Y component group and the (j−L)th Y component group.

In an embodiment, performing a region grouping on the jth Y component group and the (j−1)th Y component group includes: grouping the jth Y component group and the (j−1)th Y component group into a same region when the first absolute value is smaller than or equal to the preset threshold; and grouping the jth Y component group and the (j−1)th Y component group into different regions when the first absolute value is greater than the preset threshold.

In an embodiment, performing a region grouping on the jth Y component group and the (j−L)th Y component group includes: grouping the jth Y component group and the (j−L)th Y component group into a same region when the second absolute value is smaller than or equal to the preset threshold; and grouping the jth Y component group and the (j−L)th Y component group into different regions when the second absolute value is greater than the preset threshold.

In an embodiment, separately performing a region grouping on the jth Y component group and the (j−1)th Y component group and on the jth Y component group and the (j−L)th Y component group includes: grouping the jth Y component group, the (j−1)th Y component group and the (j−L)th Y component group into a same region when the first absolute value and the second absolute value are both smaller than or equal to the preset threshold; grouping the jth Y component group and the (j−1)th Y component group into different regions and the jth Y component group and the (j−L)th Y component group into different regions when the first absolute value and the second absolute value are both greater than the preset threshold; grouping the jth Y component group and the (j−1)th Y component group into a same region and the jth Y component group and the (j−L)th Y component group into different regions when the first absolute value is smaller than or equal to the preset threshold and the second absolute value is greater than the preset threshold; and grouping the jth Y component group and the (j−L)th Y component group into a same region and the jth Y component group and the (j−1)th Y component group into different regions when the first absolute value is greater than the preset threshold and the second absolute value is smaller than or equal to the preset threshold.

In a second aspect, a terminal is provided in an embodiment of the disclosure, including: a decoding unit, a grouping unit, an adjustment unit and an acquisition unit, wherein the decoding unit is arranged to decode a user-selected image to be adjusted into YUV data; the grouping unit is arranged to perform a region grouping on the image to be adjusted according to a preset grouping strategy and the YUV data to obtain the Y component reference value of at least one region; the adjustment unit is arranged to adjust the YUV data of each of the at least one region according to an adjustment coefficient to obtain the adjusted YUV data of each region, wherein the adjustment coefficient is obtained based on the Y component reference value; and the acquisition unit is arranged to acquire, based on the adjusted YUV data, an image subjected to dynamic range adjustment.

In an embodiment, the grouping unit includes: a first acquisition sub-unit, a second acquisition sub-unit, a third acquisition sub-unit and a grouping sub-unit, wherein the first acquisition sub-unit is arranged to group Y components of the YUV data, which belong to a same pixel unit, into one group to obtain at least one Y component group; the second acquisition sub-unit is arranged to acquire the Y component value of the jth Y component group, where j represents a group number which is a positive integer; the third acquisition sub-unit is arranged to acquire the absolute value of the difference between the Y component value of the jth Y component group and a Y component value of a Y component group adjacent to the jth Y component group; and the grouping sub-unit is arranged to perform a region grouping on the elements in a matrix of the groups according to a preset threshold and the absolute value of the difference between the Y component value of each group and the Y component value of each Y component group adjacent to the group.

In an embodiment, when the jth Y component group is in the first row of all the Y component groups and j is not equal to 1, a Y component group adjacent to the jth Y component group refers to the (j−1)th Y component group which is located on the left of and adjacent to the jth Y component group; or when the jth Y component group is in the first column of all the Y component groups and j is not equal to 1, a Y component group adjacent to the jth Y component group refers to the (j−L)th Y component group which is located above and adjacent to the jth Y component group; or when the jth Y component group is not in the first row and the first column, a Y component group adjacent to the jth Y component group refers to the (j−1)th Y component group and the (j−L)th Y component group.

In an embodiment, the third acquisition sub-unit is specifically arranged to calculate a first absolute value of the difference between the Y component value of the jth Y component group and an average value of the Y components in the (j−1) Y component group when a Y component group adjacent to the jth Y component group refers to the (j−1)th Y component group, or calculate a second absolute value of the difference between the Y component value of the jth Y component group and an average value of the Y components in the (j−L) Y component group when a Y component group adjacent to the jth Y component group refers to the (j−L)th Y component group, or separately calculate the first and the second absolute values when a Y component group adjacent to the jth Y component group refers to the (j−1)th Y component group and the (j−L)th Y component group.

In an embodiment, the grouping sub-unit is specifically arranged to compare the first absolute value with the preset threshold and perform a region grouping on the jth Y component group and the (j−1)th Y component group when a Y component group adjacent to the jth Y component group refers to the (j−1)th Y component group, or compare the second absolute value with the preset threshold and perform a region grouping on the jth Y component group and the (j−L)th Y component group when a Y component group adjacent to the jth Y component group refers to the (j−L)th Y component group, or compare the first absolute value and the second absolute value separately with the preset threshold and separately perform a region grouping on the jth Y component group and the (j−1)th Y component group and on the jth Y component group and the (j−L)th Y component group when a Y component group adjacent to the jth Y component group refers to the (j−1)th Y component group and the (j−L)th Y component group.

In an embodiment, the grouping sub-unit is specifically arranged to group the jth Y component group and the (j−1)th Y component group into a same region when the first absolute value is smaller than or equal to the preset threshold and group the jth Y component group and the (j−1)th Y component group into different regions when the first absolute value is greater than the preset threshold.

In an embodiment, the grouping sub-unit is specifically arranged to group the jth Y component group and the (j−L)th Y component group into a same region when the second absolute value is smaller than or equal to the preset threshold and group the jth Y component group and the (j−L)th Y component group into different regions when the second absolute value is greater than the preset threshold.

In an embodiment, the grouping sub-unit is specifically arranged to group the jth Y component group, the (j−1)th Y component group and the (j−L)th Y component group into a same region when the first absolute value and the second absolute value are both smaller than or equal to the preset threshold, group the jth Y component group and the (j−1)th Y component group into different regions and the jth Y component group and the (j−L)th Y component group into different regions when the first absolute value and the second absolute value are both greater than the preset threshold, group the jth Y component group and the (j−1)th Y component group into a same region and the jth Y component group and the (j−L)th Y component group into different regions when the first absolute value is smaller than or equal to the preset threshold and the second absolute value is greater than the preset threshold, and group the jth Y component group and the (j−L)th Y component group into a same region and the jth Y component group and the (j−1)th Y component group into different regions when the first absolute value is greater than the preset threshold and the second absolute value is smaller than or equal to the preset threshold.

In a third aspect, a storage medium is also provided in an embodiment of the disclosure which includes a set of instructions which, when executed, cause at least one processor to execute the foregoing operation.

A method and a terminal for adjusting a dynamic range of an image and a storage medium are provided in embodiments of the disclosure, the terminal first decodes a user-selected image to be adjusted into YUV data, then performs a region grouping on the image to be adjusted according to a preset grouping strategy and the YUV data to obtain the Y component reference value of at least one region, subsequently adjusts the YUV data of each of the at least one region according to an adjustment coefficient to obtain the adjusted YUV data of each region, and at last acquires, based on the adjusted YUV data, an image subjected to dynamic range adjustment; it can be known from the description of the foregoing method that the terminal can selectively perform an adjustment according to the selection of the user on certain regions of an image so that the effect of the adjusted image is much closer to the expectation of the user, thus, the terminal can effectively address the problem existing in the conventional art that the quality of an image is lowered due to the loss of some details in the image and consequentially improves the quality of the image.

BRIEF DESCRIPTION OF THE DRAWINGS

FIG. 2 is a schematic diagram illustrating the YUV 420 data of an image to be adjusted according to an embodiment of the disclosure;

FIG. 3 is a flowchart illustrating a region grouping performed by a terminal on YUV data according to an embodiment of the disclosure;

DETAILED DESCRIPTION

The technical solutions provided in embodiments of the disclosure will be described clearly and completely below with reference to accompanying drawings.

Figure 1:
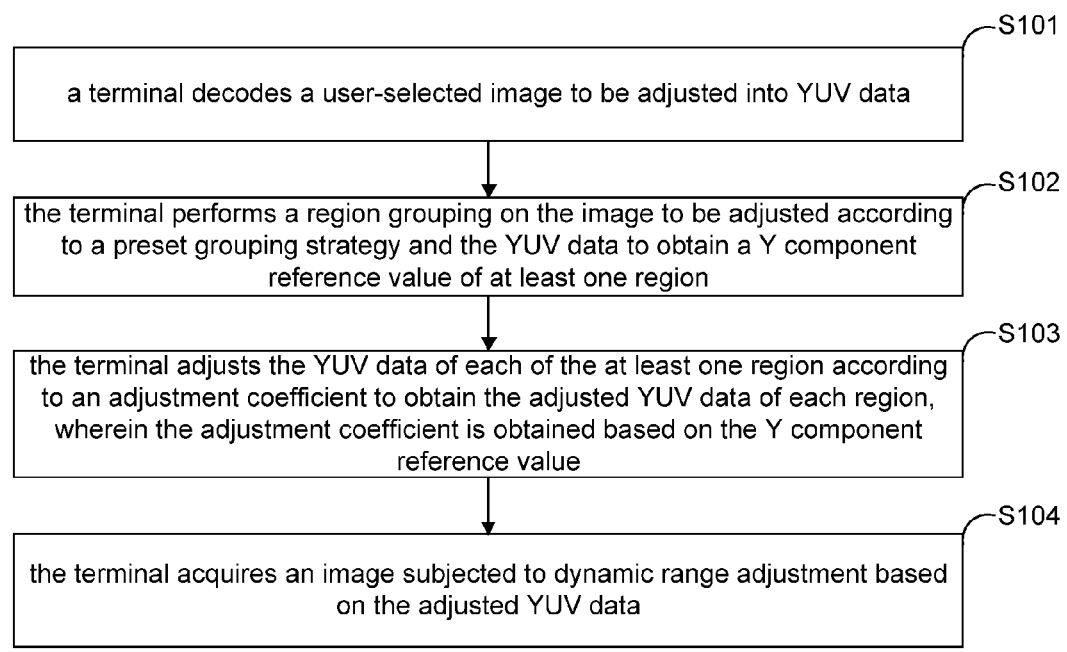
FIG. 1 is a flowchart of a method for adjusting a dynamic range of an image according to an embodiment of the disclosure.

FIG. 1 is a flowchart of a method for adjusting a dynamic range of an image according to an embodiment of the disclosure, and as shown in FIG. 1, the method includes the following steps:

S101: a terminal decodes a user-selected image to be adjusted into YUV data;

Specifically, the terminal may decode the image to be adjusted according to a color coding method to obtain YUV data corresponding to the image to be adjusted.

YUV data may be in a plurality of formats, and according to different sampling rates, YUV data can be classified into data in different formats, for example, YUV 420 data, YUV 411 data and YUV 422 data, wherein YUV 420 data refer to the sharing of a U component and a V component by the Y components of the four pixels in each pixel unit consisting of 2*2 pixels and the sequential arrangement of the Y components and the alternative arrangement of the U component and the V component in the pixel unit.

YUV 411 data refer to the sharing of a U component and a V component by the Y components of the four pixels in each pixel unit consisting of 4*1 pixels; and YUV 422 data refer to the sharing of a U component and a V component by the Y components of the two pixels in each pixel unit consisting of 2*1 pixels.

It should be noted that although the embodiment is described by taking YUV 420 data as an example, the technical solution provided in the embodiment is also applicable to data in other YUV formats.

In the embodiment, FIG. 2 is a schematic diagram illustrating the YUV 420 data of an image to be adjusted according to an embodiment of the disclosure, refer to FIG. 2, the value ranges of Y, U and V are all [0, 255], X represents a horizontal direction, Y represents a perpendicular direction, a Y component has L*W pixels, in the horizontal direction, there are L Y components in each row, and in the perpendicular direction, there are W Y components in each column, Y[i] is the Y component of the ith pixel, where i is an integer greater than and equal to 1. The U components and the V components shown in FIG. 2 which are arranged alternatively totally have L*W pixels, in FIG. 2, U[i] represents a U component corresponding to the ith pixel unit, and V[i] represents a V component corresponding to the ith pixel unit. Therefore, the length buffer[Y] of Y components is L*W, the length buffer[U] of U components is (L×W)/2, and the length buffer[V] of V components is (L×W)/2.

It should be noted that in the embodiment, the image to be adjusted may be an image in a JPEG format or a JIF format, and no specific limitations are given herein to this.

At S102, the terminal performs a region grouping on the image to be adjusted according to a preset grouping strategy and the YUV data to obtain the Y component reference value of at least one region.

Figure 4:
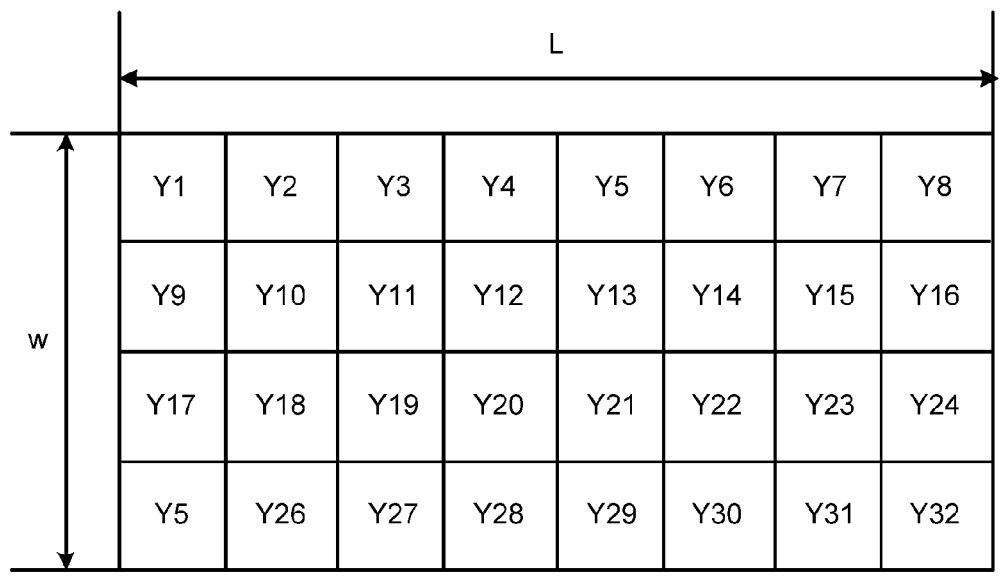
FIG. 4 is a schematic diagram illustrating a 8*4 Y component pixel matrix in YUV data according to an embodiment of the disclosure.

Exemplarily, FIG. 3 is a flowchart illustrating a region grouping performed by a terminal on YUV data according to an embodiment of the disclosure, refer to FIG. 3, a process that a terminal performs a region grouping on YUV data corresponding to an image to be adjusted according to a preset grouping strategy specifically includes S301-S304:

At S301, a terminal groups Y components of YUV data, which belong to a same pixel unit, into one group to obtain at least one Y component group;

A 8*4 Y component pixel matrix selected from the YUV data shown in FIG. 2 is exemplified in the embodiment, and as shown in FIG. 4, in the selected 8*4 Y component pixel matrix, there are 8 Y components in each row and 4 Y components in each column.

FIG. 4 is a schematic diagram illustrating a 8*4 Y component pixel matrix in YUV data according to an embodiment of the disclosure, in the Y component pixel matrix shown in FIG. 4, because four Y components consisting of Y1, Y2, Y9 and Y10 are in a same pixel unit, Y1, Y2, Y9 and Y10 are grouped into a same Y component group. All the Y components included in the Y component pixel matrix shown in FIG. 4 can be grouped in the foregoing way to obtain a 4*2 matrix of the groups shown in FIG. 5, and in the 4*2 matrix of the groups shown in FIG. 5, each of the first Y component group to the eighth Y component group is an element of the matrix of the groups.

It should be noted that YUV data are presented in a matrix form in the embodiment, however, YUV data can be presented in other forms, and no specific limitations are given herein to this.

S302: the terminal acquires the Y component value of the jth Y component group.

Specifically, in the embodiment, the terminal may calculate an average value of the 2*2 Y components included in the jth Y component group according to the following formula (1):

$$\overline{y_j} = \frac{Y_{(2j-1)} + Y_{(2j)} + Y_{(L+2j-1)} + Y_{(L+2j)}}{4} \quad (1)$$

where $\overline{y_j}$ represents the Y component value of the jth component group, j represents a group number which is a positive integer, and L represents the number of the Y components in each row of YUV data.

Figure 5:
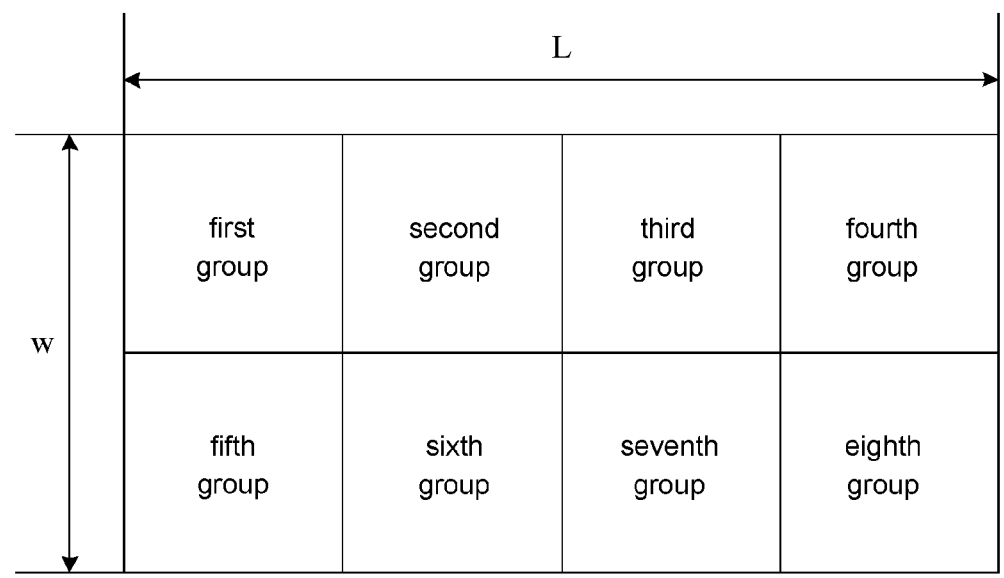
FIG. 5 is a schematic diagram illustrating the grouping of all the Y components in a Y component pixel matrix according to an embodiment of the disclosure.

In the embodiment, the Y component values of the Y component groups included in the matrix of the groups shown in FIG. 5 that are calculated according to the formula (1) are shown in Table 1.

TABLE 1

| $\overline{y_1}$ = 10 | $\overline{y_2}$ = 15 | $\overline{y_3}$ = 40 | $\overline{y_4}$ = 100 |
|---|---|---|---|
| $\overline{y_5}$ = 35 | $\overline{y_6}$ = 60 | $\overline{y_7}$ = 55 | $\overline{y_8}$ = 90 |

S303: the terminal acquires the absolute value of the difference between the Y component value of the jth Y component group and a Y component value of a Y component group adjacent to the jth Y component group.

It should be noted that according to the position of the jth Y component group in a matrix of the groups, the adjacency of a Y component group to the jth Y component group may is one of the following three cases:

case 1: when the jth Y component group is in the first row of all Y component groups and j is not equal to 1, a Y component group adjacent to the jth Y component group refers to the (j−1)th Y component group which is located on the left of and adjacent to the jth Y component group;

case 2: when the jth Y component group is in the first column of all Y component groups and j is not equal to 1, a Y component group adjacent to the jth Y component group refers to the (j−L)th Y component group which is located above and adjacent to the jth Y component group; and case 3: when the jth Y component group is not in the first row and the first column, a Y component group adjacent to the jth Y component group refers to the (j−1)th Y component group and the (j−L)th Y component group.

Accordingly, corresponding to the three cases of the adjacency of a Y component group to the jth Y component group, the absolute value of the difference between the Y component value of the jth Y component group and the Y component value of a Y component group adjacent to the jth Y component group also correspondingly refers to one of the following three absolute values:

corresponding to case 1, in the groups shown in Table 1, each of the second to the fourth Y component group has only one adjacent Y component group which is located on the left thereof, wherein the Y component group which is located on the left of and adjacent to the second Y component group is the first Y component group; the Y component group which is located on the left of and adjacent to the third Y component group is the second Y component group; and the Y component group which is located on the left of and adjacent to the fourth Y component group is the third Y component group. The terminal calculates the absolute value $\Delta y_{(2,1)}$ of the difference between the Y component value of the second Y component group and the Y component value of the first Y component group which is located on the left of and adjacent to the second Y component group according to the following formula: $\Delta y_{(2,1)} = |\overline{y_2} - \overline{y_1}| = |15-10| = 5$, by analogy, the terminal calculates the absolute value $\Delta y_{(3,2)}$ of the difference between the Y component value of the third Y component group and the Y component value of the second Y component group which is located on the left of and adjacent to the third Y component group to obtain a result of 25 and the absolute value $\Delta y_{(4,3)}$ of the difference between the Y component value of the fourth Y component group and the Y component value of the third Y component group which is located on the left of and adjacent to the fourth Y component group to obtain a result of 60.

Corresponding to case 2, in the groups shown in the Table 1, the fifth Y component group has only one adjacent Y component group, that is, the first Y component group, which is located above the fifth Y component group, thus, the terminal calculates the absolute value $\Delta y_{(5,1)}$ of the difference between the Y component value of the fifth Y component group and the Y component value of the first Y component group which is located above and adjacent to the fifth Y component group to be 25 to obtain a result of 25.

Corresponding to case 3, in the groups shown in Table 5, each of the sixth to the eighth Y component group has two adjacent Y component groups which are located on the left of and above the sixth, seventh or eighth Y component group, respectively; the Y component group which is located on the left of and adjacent to the sixth Y component group is the fifth Y component group, and the Y component group which is located above and adjacent to the sixth Y component group is the second Y component group; the Y component group which is located on the left of and adjacent to the seventh Y component group is the sixth Y component group, and the Y component group which is located above and adjacent to the seventh Y component group is the third Y component group; and the Y component group which is located on the left of and adjacent to the eighth Y component group is the seventh Y component group, and the Y component group which is located above and adjacent to the eighth Y component group is the fourth Y component group. The terminal calculates the absolute value $\Delta y_{(6,5)}$ of the difference between the Y component value of the sixth Y component group and the Y component value of the fifth Y component group which is located on the left of and adjacent to the sixth Y component group to obtain a result of 25 and the absolute value $\Delta y_{(6,2)}$ of the difference between the Y component value of the sixth Y component group and the Y component value of the second Y component group which is located above and adjacent to the sixth Y component group to obtain a result of 45.

By analogy, the terminal calculates the absolute value $\Delta y_{(7,6)}$ of the difference between the Y component value of the seventh Y component group and the Y component value of the sixth Y component group which is located on the left of and adjacent to the seventh Y component group to obtain a result of 5 and the absolute value $\Delta y_{(7,3)}$ of the difference between the Y component value of the seventh Y component group and the Y component value of the third Y component group which is located above and adjacent to the seventh Y component group to obtain a result of 15, and calculates the absolute value $\Delta y_{(8,7)}$ of the difference between the Y component value of the eighth Y component group and the Y component value of the seventh Y component group which is located on the left of and adjacent to the eighth Y component group to obtain a result of 35 and the absolute value $\Delta y_{(8,4)}$ of the difference between the Y component value of the eighth Y component group and the Y component value of the fourth Y component group which is located above and adjacent to the eighth Y component group to obtain a result of 10.

At S304: the terminal performs a region grouping on elements in a matrix of the groups according to a preset threshold and the absolute value of the difference between the Y component value of each group and a Y component value of each Y component group adjacent to the group.

Specifically, because the existence of a Y component group adjacent to the jth Y component group is classified into three situations: that is, the existence of a Y component group which is located on the left of and adjacent to the jth Y component group, the existence of a Y component group which is located above and adjacent to the jth Y component group, and the existence of a Y component group which is located on the left of and adjacent to the jth Y component group and a Y component group which is located above and adjacent to the jth Y component group, the region grouping for the elements in the jth Y component group is also correspondingly classified into the following three situations:

situation 1: if the jth Y component group has only one adjacent Y component group which is located on the left of the jth Y component group, then the terminal compares the absolute value of the difference between the Y component value of the jth Y component group and the Y component value of the Y component group which is located on the left of and adjacent to the jth Y component group with the preset threshold and groups the jth Y component group and the Y component group which is located on the left of and adjacent to the jth Y component group into a same region if the absolute value is smaller than or equal to the preset threshold or groups the jth Y component group and the Y component group which is located on the left of and adjacent to the jth Y component group into different regions if the absolute value is greater than the preset threshold.

For instance, by taking a preset threshold $\Delta y'$ being 20 as an example, in the data shown in Table 1, each of the second to the fourth Y component group has only one adjacent Y component group which is located on the left of the second, third or fourth Y component group, according to the method used in situation 1 for region grouping, because $\Delta y_{(2,1)}=5<\Delta y'$, $\Delta y_{(3,2)}=25>\Delta y'$, and $\Delta y_{(4,3)}=60>\Delta y'$, the second Y component group and the first Y component group are grouped into a same region, the third Y component group and the second Y component group are grouped into different regions, and the fourth Y component group and the third Y component group are grouped into the different regions.

Situation 2: if the jth Y component group has only one adjacent Y component group which is located above the jth Y component group, then the terminal compares the absolute value of the difference between the Y component value of the jth Y component group and the Y component value of the Y component group which is located above and adjacent to the jth Y component group with the preset threshold and groups the jth Y component group and the Y component group which is located above and adjacent to the jth Y component group into a same region if the absolute value is smaller than or equal to the preset threshold or groups the jth Y component group and the Y component group which is located above and adjacent to the jth Y component group into different regions if the absolute value is greater than the preset threshold.

In the embodiment, in the data shown in Table 1, the fifth Y component group has only one adjacent Y component group which is located above the fifth Y component group, thus, according to the method used in situation 2 for region grouping, because $\Delta y_{(5,1)}=25>\Delta y'$, the fifth Y component group and the first Y component group are not in a same region.

Situation 3: when the jth Y component group has an adjacent Y component group which is located on the left of the jth Y component group and an adjacent Y component group which is located above the jth Y component group, the terminal separately compares the absolute value of the difference between the Y component value of the jth Y component group and the Y component value of the Y component group which is located on the left of and adjacent to the jth Y component group with the preset threshold and the absolute value of the difference between the Y component value of the jth Y component group and the Y component value of the Y component group which is located above and adjacent to the jth Y component group with the preset threshold, and groups the jth Y component group, the Y component group which is located on the left of and adjacent to the jth Y component group and the Y component group which is located above and adjacent to the jth Y component group into a same region if the absolute values are both smaller than or equal to the preset threshold, groups each of the jth Y component group, the Y component group which is located on the left of and adjacent to the jth Y component group and the Y component group which is located above and adjacent to the jth Y component group into a different region if the absolute values are both greater than the preset threshold, groups the jth Y component group and the Y component group which is located above and adjacent to the jth Y component group into a same region and the jth Y component group and the Y component group which is located on the left of and adjacent to the jth Y component group into different regions if the absolute value of the difference between the Y component value of the jth Y component group and the Y component value of the Y component group which is located on the left of and adjacent to the jth Y component group is greater than the present threshold and the absolute value of the difference between the Y component value of the jth Y component group and the Y component value of the Y component group which is located above and adjacent to the jth Y component group is smaller than or equal to the present threshold, or groups the jth Y component group and the Y component group which is located on the left of and adjacent to the jth Y component group into a same region and the jth Y component group and the Y component group which is located above and adjacent to the jth Y component group into different regions if the absolute value of the difference between the Y component value of the jth Y component group and the Y component value of the Y component group which is located on the left of and adjacent to the jth Y component group is smaller than or equal to the present threshold and the absolute value of the difference between the Y component value of the jth Y component group and the Y component value of the Y component group which is located above and adjacent to the jth Y component group is greater than the present threshold.

In the embodiment, in the data shown in Table 1, each of the sixth to the eighth Y component group has an adjacent Y component group which is located on the left of the sixth, seventh or eighth Y component group and an adjacent Y component group which is located above the sixth, seventh or eighth Y component group, according to the method used in situation 3 for region grouping, because $\Delta y_{(6,5)}$ is greater than $\Delta y'$, $\Delta y_{(6,2)}$ is greater than $\Delta y'$, $\Delta y_{(7,6)}$ is smaller than $\Delta y'$, $\Delta y_{(7,3)}$ is smaller than $\Delta y'$, $\Delta y_{(8,7)}$ is greater than $\Delta y'$ and $\Delta y_{(8,4)}$ is smaller than $\Delta y'$, sixth Y component group is in a region different from a region where each of the fifth Y component group and the second Y component group is located, the seventh, the sixth and the third Y component group are all in a same regions, the eighth and the seventh Y component group are not in a same region, and the eighth and the fourth Y component group are in a same region.

Figure 6:
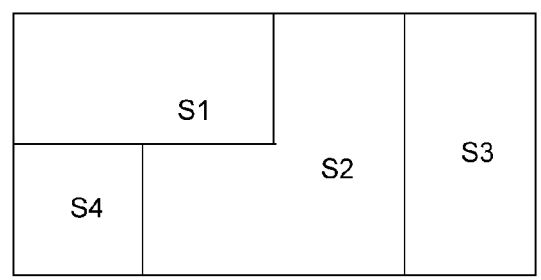
FIG. 6 is a schematic diagram illustrating a region grouping performed on YUV data according to an embodiment of the disclosure.

After the region grouping is performed on each group in each of the foregoing three situations, the terminal identifies each grouped region with an identifier $S_k$, where k represents a region number, as shown in FIG. 6, according to the result of the foregoing grouping, the terminal groups eight Y component groups into four regions and identifies the four regions with identifiers $S_1$-$S_4$, where $S_1$ includes the first and the second Y component groups, $S_2$ includes the third, the sixth and the seventh Y component groups, $S_3$ includes the fourth and the eighth Y component groups, and $S_4$ includes the fifth Y component group.

After performing the region grouping by executing S301-S304, the terminal also needs to acquire the reference value of each region and records the reference value as A[k], where k represents a region number.

Specifically, if there is only one Y component group in the kth region, then the Y component value of the Y component group is taken as the reference value of the kth region, and if there are a plurality of Y component groups in the kth region, the Y component value of the Y component group whose group number is smallest is taken as the reference value of the kth region. The above is merely an approach adopted in the embodiment to acquire the reference value of each region, it should be appreciated that the reference value of each region can also be acquired in other ways, for example, when there is a plurality of Y component groups in the kth region, the Y component group of any of the plurality of Y component groups can be taken as the reference value of the kth region, no specific limitations are given herein to this.

Exemplarily, as shown in FIG. 6, the reference value of the first region $S_1$ is the Y component value of the first Y component group, that is, $A[1]=\overline{y_1}=10$; because the second region $S_2$ includes the third, the sixth and the seventh Y component group, the reference value of the second region $S_2$ is the Y component value of the third Y component group, that is $A[2]=\overline{y_3}=40$; because the third region $S_3$ includes the fourth and the eighth Y component group, the reference value of the third region $S_3$ is the Y component value of the fourth Y component group, that is, $A[3]=\overline{y_4}=100$, and the reference value of the fourth region $S_4$ is the Y component value of the fifth Y component group, that is, $A[4]=\overline{y_5}=35$.

So far, the terminal completes the region grouping for the YUV data corresponding to the image to be adjusted and obtains the Y component reference value of at least one region.

At S103: the terminal adjusts the YUV data of each of the at least one region according to an adjustment coefficient to obtain the adjusted YUV data of each region, wherein the adjustment coefficient is obtained based on the Y component reference value.

Specifically, the process that the terminal adjusts the YUV data of each of the at least one region according to an adjustment coefficient is as follows: the terminal determines a region to be adjusted according to a user-selected adjustment mode and adjusts the region to be adjusted based on the adjustment coefficient, wherein the adjustment mode includes an automatic adjustment mode and a nonautomatic adjustment mode.

When the user selects the nonautomatic adjustment mode, the terminal adjusts the YUV data of the region to be adjusted according to a to-be-adjusted region identifier input by the user and the adjustment coefficient of the region to be adjusted to obtain the adjusted YUV data of the image to be adjusted, wherein the adjustment coefficient is represented with a[k] whose value range is [0,255/A[k]], in which A[k] represents the reference value of a region to be adjusted, and k represents a region number.

When the user selects the automatic adjustment mode, the terminal adjusts the whole region. The processing conducted in the automatic adjustment mode is a same as that conducted in the nonautomatic adjustment mode except that the value of the adjustment coefficient a[k] is the intermediate value of 0 to 255/A[k].

For instance, the terminal groups the YUV data of an image to be adjusted into four regions, that is, a first to a fourth region whose region identifiers are $S_1$-$S_4$, the Y component reference values of the four regions are A[1], A[2], A[3] and A[4]; when the user selects the nonautomatic adjustment mode to adjust the YUV data of the second region, the terminal determines the second region as a region to be adjusted according to the region identifier S2 input by the user and synchronously calculates the adjustment coefficient a[2] of the second region, that is, a[2]=0~255/A[2] =0~255/40, the terminal can display the adjustment coefficient as a progress bar and then calculate, based on the reference value of the region, a corresponding adjustment coefficient according to the drag by the user on the progress bar to adjust the YUV data of the region to be adjusted by taking the product of the reference value and the adjustment coefficient as the adjusted YUV data of the region to be adjusted.

In an embodiment, when the user desires to adjust the YUV data of another region to be adjusted, the YUV data of another region to be adjusted can be adjusted by performing the foregoing processing.

It should be noted the adjustment coefficient can be displayed as a progress bar or an input value or displayed in any other form that can display the adjustment coefficient, and no specific limitations are given herein to this.

S104: the terminal acquires an image subjected to dynamic range adjustment based on the adjusted YUV data.

Specifically, after adjusting the YUV data of the image to be adjusted, the terminal compresses and decodes all the YUV data based on the adjusted YUV data to restore an image in the original format, thereby acquiring an image whose dynamic range is adjusted with respect to the original image.

For example, the terminal decodes an original image in a JPEG format into data in a YUV format and adjusts the YUV data of the image, then compresses and codes the YUV data to restore the original image in the JPEG format, thereby obtaining an image whose dynamic range is adjusted when compared with the original image.

So far, the terminal completes the adjustment on the dynamic range of an image.

It can be known from the foregoing description that a terminal decodes a user-selected image to be adjusted into YUV data, then performs a region grouping on the YUV data corresponding to the image to be adjusted according to a preset grouping strategy to obtain the reference value of each region, sequentially adjusts the YUV data of a region to be adjusted according to the identifier of the region to be adjusted and an adjustment coefficient to obtain the adjusted YUV data of the image to be adjusted, and finally compresses and decodes the adjusted YUV data to obtain an image whose dynamic range is adjusted when compared with the image to be adjusted, because the terminal adjusts the dynamic range of an image in this way, the requirement of the user for an adjustment on certain regions is met better, the effect of the adjusted image is much closer to the expectation of the user, thus effectively addressing the problem existing in the conventional art that the quality of an image is lowered due to the loss of some details in the image and consequentially improving the quality of the image.

Based on the same inventive concept, a storage medium is also provided in an embodiment of the disclosure which includes a set of instructions which, when executed, cause at least one processor to execute the foregoing operation.

Based on the same inventive concept, a terminal is provided in an embodiment of the disclosure which is the same as the foregoing terminals described in the foregoing one or several embodiments.

Figure 7:
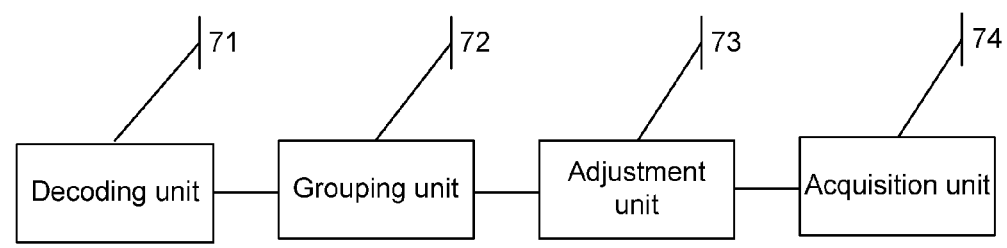
FIG. 7 is a schematic diagram illustrating the structure of a terminal according to an embodiment of the disclosure.

FIG. 7 is a schematic diagram illustrating the structure of a terminal according to an embodiment of the disclosure, refer to FIG. 7, the terminal includes: a decoding unit 71, a grouping unit 72, an adjustment unit 73 and an acquisition unit 74, wherein the decoding unit 71 is arranged to decode a user-selected image to be adjusted into YUV data;

the grouping unit 72 is arranged to perform a region grouping on the image to be adjusted according to a preset grouping strategy and the YUV data to obtain the Y component reference value of at least one region;

the adjustment unit 73 is arranged to adjust the YUV data of each of the at least one region according to an adjustment coefficient to obtain the adjusted YUV data of each region, wherein the adjustment coefficient is obtained based on the Y component reference value; and the acquisition unit 74 is arranged to acquire, based on the adjusted YUV data, an image subjected to dynamic range adjustment.

The decoding unit 71 can be implemented as a decoder, and the grouping unit 72, the adjustment unit 73 and the acquisition unit 74 can be implemented as a Central Processing Unit (CPU), a Digital Signal Processor (DSP) or a Field Programmable Gate Array (FPGA) arranged in the terminal.

In an embodiment, the grouping unit 72 includes: a first acquisition sub-unit, a second acquisition sub-unit, a third acquisition sub-unit and a grouping sub-unit, wherein the first acquisition sub-unit is arranged to group Y components of YUV data, which belong to a same pixel unit, into one group to obtain at least one Y component group;

the second acquisition sub-unit is arranged to acquire the Y component value of the jth Y component group, where j represents a group number which is a positive integer;

the third acquisition sub-unit is arranged to acquire the absolute value of the difference between the Y component value of the jth Y component group and a Y component value of a Y component group adjacent to the jth Y component group; and the grouping sub-unit is arranged to perform a region grouping on elements in a matrix of the groups according to a preset threshold and the absolute value of the difference between the Y component value of each group and a Y component value of each Y component group adjacent to the group.

The first, the second and the third acquisition sub-unit and the grouping sub-unit can be implemented as the CPU, DSP or FPGA in the terminal.

In an embodiment, when the jth Y component group is in the first row of all the Y component groups and j is not equal to 1, a Y component group adjacent to the jth Y component group refers to the (j−1)th Y component group which is located on the left of and adjacent to the jth Y component group; or when the jth Y component group is in the first column of all the Y component groups and j is not equal to 1, a Y component group adjacent to the jth Y component group refers to the (j−L)th Y component group which is located above and adjacent to the jth Y component group; or when the jth Y component group is not in the first row and the first column, a Y component group adjacent to the jth Y component group refers to the (j−1)th Y component group and the (j−L)th Y component group.

In an embodiment, the third acquisition sub-unit is specifically arranged to calculate a first absolute value of the difference between the Y component value of the jth Y component group and a Y component value of the (j−1) Y component group when a Y component group adjacent to the jth Y component group refers to the (j−1)th Y component group, or calculate a second absolute value of the difference between the Y component value of the jth Y component group and a Y component value of the (j−L) Y component group when a Y component group adjacent to the jth Y component group refers to the (j−L)th Y component group, or separately calculate the first and the second absolute values when a Y component group adjacent to the jth Y component group refers to the (j−1)th Y component group and the (j−L)th Y component group.

In an embodiment, the grouping sub-unit is specifically arranged to compare the first absolute value with the preset threshold and perform a region grouping on the jth Y component group and the (j−1)th Y component group when a Y component group adjacent to the jth Y component group refers to the (j−1)th Y component group, or compare the second absolute value with the preset threshold and perform a region grouping on the jth Y component group and the (j−L)th Y component group when a Y component group adjacent to the jth Y component group refers to the (j−L)th Y component group, or compare the first absolute value and the second absolute value separately with the preset threshold and separately perform a region grouping on the jth Y component group and the (j−1)th Y component group and on the jth Y component group and the (j−L)th Y component group when a Y component group adjacent to the jth Y component group refers to the (j−1)th Y component group and the (j−L)th Y component group.

In an embodiment, the grouping sub-unit is specifically arranged to group the jth Y component group and the (j−1)th Y component group into a same region when the first absolute value is smaller than or equal to the preset threshold and group the jth Y component group and the (j−1)th Y component group into different regions when the first absolute value is greater than the preset threshold.

In an embodiment, the grouping sub-unit is specifically arranged to group the jth Y component group and the (j−L)th Y component group into a same region when the second absolute value is smaller than or equal to the preset threshold and group the jth Y component group and the (j−L)th Y component group into different regions when the second absolute value is greater than the preset threshold.

In an embodiment, the grouping sub-unit is specifically arranged to group the jth Y component group, the (j−1)th Y component group and the (j−L)th Y component group into a same region when the first absolute value and the second absolute value are both smaller than or equal to the preset threshold, group the jth Y component group and the (j−1)th Y component group into different regions and the jth Y component group and the (j−L)th Y component group into different regions when the first absolute value and the second absolute value are both greater than the preset threshold, group the jth Y component group and the (j−1)th Y component group into a same region and the jth Y component group and the (j−L)th Y component group into different regions when the first absolute value is smaller than or equal to the preset threshold and the second absolute value is greater than the preset threshold, and group the jth Y component group and the (j−L)th Y component group into a same region and the jth Y component group and the (j−1)th Y component group into different regions when the first absolute value is greater than the preset threshold and the second absolute value is smaller than or equal to the preset threshold.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above is merely preferred embodiments of the disclosure but is not to be construed as limiting the scope of the disclosure.

What is claimed is:

1. A method for adjusting a dynamic range of an image, applied in a terminal, the method comprising:
    decoding a user-selected image to be adjusted into YUV data;
    performing, according to a preset grouping strategy and the YUV data, a region grouping on the user-selected image to be adjusted to obtain a Y component reference value of at least one region;
    adjusting, according to an adjustment coefficient, the YUV data of each of the at least one region to obtain adjusted YUV data of each region, wherein the adjustment coefficient is obtained based on the Y component reference value; and
    acquiring, based on the adjusted YUV data, an image subjected to dynamic range adjustment;
    wherein performing, according to the preset grouping strategy and the YUV data, the region grouping on the image to be adjusted comprises:
        grouping Y components of the YUV data, which belong to a same pixel unit, into one group to obtain at least one Y component group;
        acquiring a Y component value of a jth Y component group, where j represents a group number which is a positive integer;
        acquiring an absolute value of the difference between the Y component value of the jth Y component group and a Y component value of a Y component group adjacent to the jth Y component group; and
        performing the region grouping on elements in a matrix of the Y component groups according to a preset threshold and the absolute value of the difference between the Y component value of each Y component group and a Y component value of each Y component group adjacent to the Y component group.

2. The method according to claim 1, wherein when the jth Y component group is in the first row of all the Y component groups and j is not equal to 1, a Y component group adjacent to the jth Y component group refers to a (j−1)th Y component group which is located on the left of and adjacent to the jth Y component group; or
    when the jth Y component group is in the first column of all the Y component groups and j is not equal to 1, a Y component group adjacent to the jth Y component group refers to a (j−L)th Y component group which is located above and adjacent to the jth Y component group; or when the jth Y component group is not in the first row and the first column, a Y component group adjacent to the jth Y component group refers to the (j−1)th Y component group and the (j−L)th Y component group.

3. The method according to claim 2, wherein acquiring the absolute value of the difference between the Y component value of the jth Y component group and the Y component value of the Y component group adjacent to the jth Y component group comprises:
calculating a first absolute value of the difference between the Y component value of the jth Y component group and an average value of the Y components in the (j−1) Y component group when the Y component group adjacent to the jth Y component group refers to the (j−1)th Y component group; or
calculating a second absolute value of the difference between the Y component value of the jth Y component group and an average value of the Y components in the (j−L) Y component group when the Y component group adjacent to the jth Y component group refers to the (j−L)th Y component group; or
separately calculating the first and the second absolute values when the Y component group adjacent to the jth Y component group refers to the (j−1)th Y component group and the (j−L)th Y component group.

4. The method according to claim 3, wherein performing the region grouping on the elements in the matrix of the Y component groups according to the preset threshold and the absolute value of the difference between the Y component value of each Y component group and the Y component value of each Y component group adjacent to the Y component group comprises:
when the Y component group adjacent to the jth Y component group refers to the (j−1)th Y component group, comparing the first absolute value with the preset threshold and performing the region grouping on the jth Y component group and the (j−1)th Y component group; or
when the Y component group adjacent to the jth Y component group refers to the (j−L)th Y component group, comparing the second absolute value with the preset threshold and performing the region grouping on the jth Y component group and the (j−L)th Y component group; or
when the Y component group adjacent to the jth Y component group refers to the (j−1)th Y component group and the (j−L)th Y component group, comparing the first absolute value and the second absolute value separately with the preset threshold and separately performing the region grouping on the jth Y component group and the (j−1)th Y component group and on the jth Y component group and the (j−L)th Y component group.

5. The method according to claim 4, wherein performing the region grouping on the jth Y component group and the (j−1)th Y component group comprises:
grouping the jth Y component group and the (j−1)th Y component group into a same region when the first absolute value is smaller than or equal to the preset threshold; and grouping the jth Y component group and the (j−1)th Y component group into different regions when the first absolute value is greater than the preset threshold.

6. The method according to claim 4, wherein performing the region grouping on the jth Y component group and the (j−L)th Y component group comprises:
grouping the jth Y component group and the (j−L)th Y component group into a same region when the second absolute value is smaller than or equal to the preset threshold; and grouping the jth Y component group and the (j−L)th Y component group into different regions when the second absolute value is greater than the preset threshold.

7. The method according to claim 4, wherein separately performing the region grouping on the jth Y component group and the (j−1)th Y component group and on the jth Y component group and the (j−L)th Y component group comprises:
grouping the jth Y component group, the (j−1)th Y component group and the (j−L)th Y component group into a same region when the first absolute value and the second absolute value are both smaller than or equal to the preset threshold;
grouping the jth Y component group and the (j−1)th Y component group into different regions and the jth Y component group and the (j−L)th Y component group into different regions when the first absolute value and the second absolute value are both greater than the preset threshold;
grouping the jth Y component group and the (j−1)th Y component group into a same region and the jth Y component group and the (j−L)th Y component group into different regions when the first absolute value is smaller than or equal to the preset threshold and the second absolute value is greater than the preset threshold; and
grouping the jth Y component group and the (j−L)th Y component group into a same region and the jth Y component group and the (j−1)th Y component group into different regions when the first absolute value is greater than the preset threshold and the second absolute value is smaller than or equal to the preset threshold.

8. A terminal, comprising:
a memory storing processor-executable instructions; and
a processor arranged to execute the stored processor-executable instructions to perform steps of:
decoding a user-selected image to be adjusted into YUV data;
performing, according to a preset grouping strategy and the YUV data, a region grouping on the user-selected image to be adjusted to obtain a Y component reference value of at least one region;
adjusting, according to an adjustment coefficient, the YUV data of each of the at least one region to obtain adjusted YUV data of each region, wherein the adjustment coefficient is obtained based on the Y component reference value; and
acquiring, based on the adjusted YUV data, an image subjected to dynamic range adjustment;
wherein performing, according to the preset grouping strategy and the YUV data, the region grouping on the image to be adjusted comprises:
grouping the Y components of the YUV data, which belong to a same pixel unit, into one group to obtain at least one Y component group;
acquiring a Y component value of a jth Y component group, where j represents a group number which is a positive integer;
acquiring an absolute value of the difference between the Y component value of the jth Y component group and a Y component value of a Y component group adjacent to the jth Y component group; and performing the region grouping on elements in a matrix of the Y component groups according to a preset threshold and the absolute value of the difference between the Y component value of each Y component group and a Y component value of each Y component group adjacent to the Y component group.

9. The terminal according to claim 8, wherein when the jth Y component group is in the first row of all the Y component groups and j is not equal to 1, a Y component group adjacent to the jth Y component group refers to a (j−1)th Y component group which is located on the left of and adjacent to the jth Y component group; or
when the jth Y component group is in the first column of all the Y component groups and j is not equal to 1, a Y component group adjacent to the jth Y component group refers to a (j−L)th Y component group which is located above and adjacent to the jth Y component group; or
when the jth Y component group is not in the first row and the first column, a Y component group adjacent to the jth Y component group refers to the (j−1)th Y component group and the (j−L)th Y component group.

10. The terminal according to claim 9, wherein acquiring the absolute value of the difference between the Y component value of the jth Y component group and the Y component value of the Y component group adjacent to the jth Y component group comprises:
calculating a first absolute value of the difference between the Y component value of the jth Y component group and an average value of the Y components in the (j−1) Y component group when the Y component group adjacent to the jth Y component group refers to the (j−1)th Y component group; or
calculating a second absolute value of the difference between the Y component value of the jth Y component group and an average value of the Y components in the (j−L) Y component group when the Y component group adjacent to the jth Y component group refers to the (j−L)th Y component group; or
separately calculating the first and the second absolute values when the Y component group adjacent to the jth Y component group refers to the (j−1)th Y component group and the (j−L)th Y component group.

11. The terminal according to claim 10, wherein performing the region grouping on the elements in the matrix of the Y component groups according to the preset threshold and the absolute value of the difference between the Y component value of each Y component group and the Y component value of each Y component group adjacent to the Y component group comprises:
when a Y component group adjacent to the jth Y component group refers to the (j−1)th Y component group, comparing the first absolute value with the preset threshold and performing the region grouping on the jth Y component group and the (j−1)th Y component group; or
when the Y component group adjacent to the jth Y component group refers to the (j−L)th Y component group, comparing the second absolute value with the preset threshold and performing the region grouping on the jth Y component group and the (j−L)th Y component group; or
when the Y component group adjacent to the jth Y component group refers to the (j−1)th Y component group and the (j−L)th Y component group, comparing the first absolute value and the second absolute value separately with the preset threshold and separately performing the region grouping on the jth Y component group and the (j−1)th Y component group and on the jth Y component group and the (j−L)th Y component group.

12. The terminal according to claim 11, wherein performing the region grouping on the jth Y component group and the (j−1)th Y component group comprises:
grouping the jth Y component group and the (j−1)th Y component group into a same region when the first absolute value is smaller than or equal to the preset threshold; and
grouping the jth Y component group and the (j−1)th Y component group into different regions when the first absolute value is greater than the preset threshold.

13. The terminal according to claim 11, wherein performing the region grouping on the jth Y component group and the (j−L)th Y component group comprises:
grouping the jth Y component group and the (j−L)th Y component group into a same region when the second absolute value is smaller than or equal to the preset threshold; and
grouping the jth Y component group and the (j−L)th Y component group into different regions when the second absolute value is greater than the preset threshold.

14. The terminal according to claim 11, wherein separately performing the region grouping on the jth Y component group and the (j−1)th Y component group and on the jth Y component group and the (j−L)th Y component group comprises:
grouping the jth Y component group, the (j−1)th Y component group and the (j−L)th Y component group into a same region when the first absolute value and the second absolute value are both smaller than or equal to the preset threshold;
grouping the jth Y component group and the (j−1)th Y component group into different regions and the jth Y component group and the (j−L)th Y component group into different regions when the first absolute value and the second absolute value are both greater than the preset threshold;
grouping the jth Y component group and the (j−1)th Y component group into a same region and the jth Y component group and the (j−L)th Y component group into different regions when the first absolute value is smaller than or equal to the preset threshold and the second absolute value is greater than the preset threshold; and
grouping the jth Y component group and the (j−L)th Y component group into a same region and the jth Y component group and the (j−1)th Y component group into different regions when the first absolute value is greater than the preset threshold and the second absolute value is smaller than or equal to the preset threshold.

15. A non-transitory computer-readable storage medium having stored therein a set of instructions which, when executed, cause at least one processor to execute a method for adjusting a dynamic range of an image, the method comprising:
decoding a user-selected image to be adjusted into YUV data;
performing, according to a preset grouping strategy and the YUV data, a region grouping on the user-selected image to be adjusted to obtain a Y component reference value of at least one region;

adjusting, according to an adjustment coefficient, the YUV data of each of the at least one region to obtain adjusted YUV data of each region, wherein the adjustment coefficient is obtained based on the Y component reference value; and acquiring, based on the adjusted YUV data, an image subjected to dynamic range adjustment;

wherein performing, according to the preset grouping strategy and the YUV data, the region grouping on the image to be adjusted comprises:

grouping Y components of the YUV data, which belong to a same pixel unit, into one group to obtain at least one Y component group;

acquiring a Y component value of a jth Y component group, where j represents a group number which is a positive integer;

acquiring an absolute value of the difference between the Y component value of the jth Y component group and a Y component value of a Y component group adjacent to the jth Y component group; and performing the region grouping on elements in a matrix of the Y component groups according to a preset threshold and the absolute value of the difference between the Y component value of each Y component group and a Y component value of each Y component group adjacent to the Y component group.

* * * * *